(No Model.)
G. F. MEYER.
ART OF MAKING ICE.
No. 435,566. Patented Sept. 2, 1890.
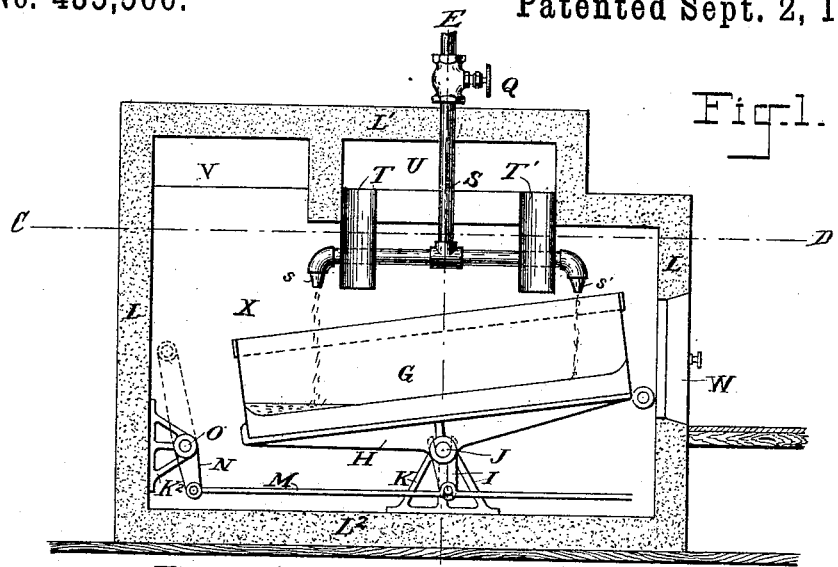
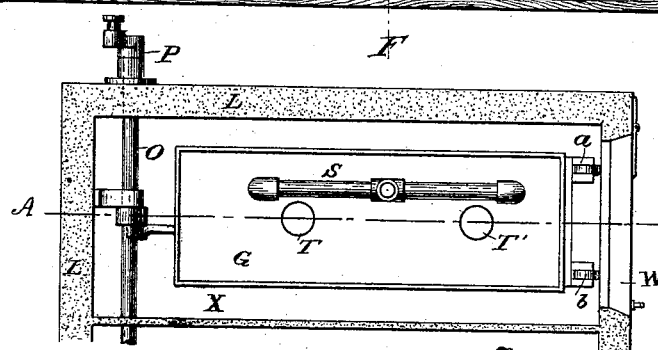
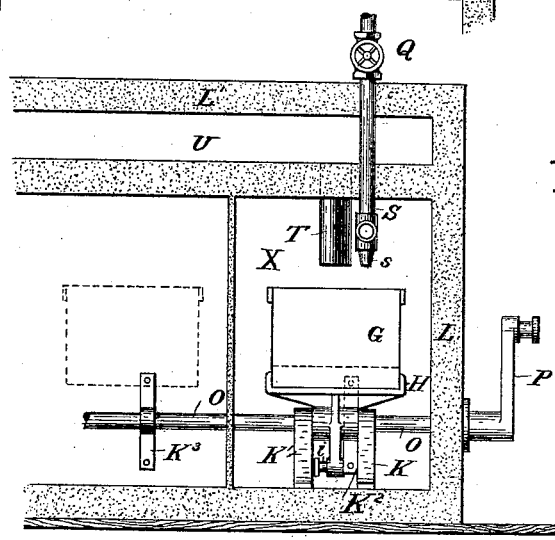
WITNESSES.
INVENTOR.

UNITED STATES PATENT OFFICE.

GEORGE F. MEYER, OF NEW YORK, N. Y.

ART OF MAKING ICE.

SPECIFICATION forming part of Letters Patent No. 435,566, dated September 2, 1890.

Application filed June 8, 1887. Renewed March 18, 1890. Serial No. 344,423. (No model.)

*To all whom it may concern:*

Be it known that I, GEORGE F. MEYER, a citizen of the United States, and a resident of the city of New York, State of New York, have invented a certain new and useful Improvement in the Art of Making Ice, of which the following is such a full, clear, and exact description as will enable others skilled in the art to which my invention appertains to make use of and practice the same.

Hitherto artificial ice has been made either by immersing in the water to be frozen hollow plates or otherwise-shaped hollow bodies, through which a cold non-congealable liquid circulated, or in which the refrigerating agent expanded, or by surrounding vessels containing the water with a cold non-congealable liquid, usually circulated. In such arrangements, however, the cold had to penetrate the ice already formed in order to increase the thickness of the piece desired to be produced. The thicker the ice grew the slower the process of freezing, and thick blocks required proportionately very much more time to freeze than thin ones. The formation of large thick pieces would sometimes occupy several days, and the loss caused by the freezing-mixture absorbing heat from the atmosphere during so long a time was of course great. Therefore in order to produce a certain quantity of ice in thick blocks during the same time such quantity could be produced in thin blocks, it was necessary to employ larger freezing-tanks, with an increased number of larger-sized cans, and this resulted in greater cost as to first outlay for plant, and also in increased running expenses. Artificial ice has also been made by freezing water in a chilled atmosphere; but in such cases the water being placed in shallow cans froze from both the top and bottom, often bursting the molds and entrapping in the blocks the air driven from the water during the process of freezing. This latter circumstance—namely, the freezing of air globules into the piece of ice—has been found to be in all the processes hitherto used a serious impediment to the production of clear commercial ice, and many different means have been employed to get rid of these globules. The water to be used has been previously deprived of its air by boiling or by distillation, or by being exposed to a vacuum produced by a special pump; but even when this was done some air would nevertheless get into the water and be inclosed in the ice during freezing. The means most commonly resorted to to get rid of the air has been the agitation of the water while freezing. In order to effect the agitation, the water in the cans has been stirred by paddles, or the cans themselves have been shaken to give motion to the water in them, or motion has been imparted to the water by forcing a current of air through a small hole in the bottom of a tube immersed in each can; but such agitation of the water when frozen in bulk retards freezing, and the apparatus required are cumbersome and expensive. In the shaking arrangements the cans have to be supported upon a heavy frame-work, and the constant spilling of the water is almost unavoidable. When paddles are used, in order that they may not be frozen fast, they must be removed from the cans before the ice-blocks are entirely closed up, and consequently such blocks will contain porous cores. Equally serious objections exist when the water is agitated by a current of air. Here the tubes immersed in the cans and their connections take the place of the paddles and gearing. The tubes like the paddles have to be removed before the blocks are completely frozen, and the cakes of ice thus produced also have porous cores. The objects of my invention are to avoid these defects and to freeze the water with uniform rapidity independent of the thickness of the ice produced, and to manufacture large and thick pieces of ice in the same proportionate time as small ones. To accomplish these objects I spread the water to be frozen into a succession of superimposed thin layers or films and subject said layers or films successively to the influence of a refrigerating agent, adding one layer or film upon another as each preceding layer or film solidifies.

I will now describe the preferable means by which my invention may be carried into operation.

The water to be frozen is gradually fed into open molds placed within freezing-chambers, which molds rest upon their widest sections and are hinged, so as to be capable of receiving an oscillating or rocking motion, preferably in the line of their longest axes. These molds may be of any shape; but I prefer them rectangular, the length considerably greater than the width, and the width equal to or greater than the depth, so that the water may have the largest possible area over which to spread and flow, and the most extended surface be exposed to the influence of the freezing agent. The water may be fed to each mold by pipes having stop-cocks or other regulating devices arranged to adjust the flow. As the water is gradually fed, currents of cold air are blown into the molds. The air may be brought to each mold through tubes opening downward above the mold and leading from a general cold-air passage through which the air is forced after its temperature has been previously reduced to below the freezing-point of water by means of any well-known refrigerating apparatus or cold-air machine. As the cold air blows in the molds are slowly rocked or tilted, thus causing the water to flow to and fro. A mold being slowly tipped or tilted toward one end the water it contains flows toward that end and exposes over the bottom of the more elevated part of such mold a thin layer or film which is rapidly frozen by the current of cold air. Then this mold being tipped or tilted back and the other end lowered, the water not frozen flows back to that end and exposes over the bottom of the now upper part of the mold another extremely thin film or layer which in turn is also frozen, and in addition the water flowing back upon the surface of the layer or film previously solidified washes off any air bubbles adhering thereto and prevents them from being inclosed within the ice. As the operation is continued, the same action is repeated with like results, and so the process goes on regularly, freezing one film or thin layer after another until a block or cake of ice of desired thickness has been formed. Now it is evident that the conditions of freezing are the same at all times whether the ice made is one or twenty inches in thickness, which is an important consideration, since the demand of the market drifts more from year to year toward heavy ice, on account of its greater durability and consequently smaller waste.
The accompanying drawings represent different views of a freezing room or compartment with its internal mechanism and illustrate a convenient form of apparatus, which, in connection with any well-known cold-air machine, may be used in practicing my invention.

Figure 1 is a vertical longitudinal section taken through the line A B of Fig. 2, the latter figure being a horizontal section taken through the line C D of Fig. 1, and representing the internal mechanism by a plan view thereof. Fig. 3 is a vertical cross-section taken through the line E F of Fig. 1, and also shows a partial sectional view of a second freezing-chamber, not shown in the other figures.

G is the galvanized-iron mold placed within the freezing-chamber X, in which the water is frozen. The walls L L and the roof L' and the floor $L^2$ are of insulating material. The mold G rests upon a suitably-formed frame H, which is supported upon brackets K and K' by the shaft J, which passes through bearings in the brackets and in the lever-arm I, which arm is rigidly attached to or formed integrally with the central portion of the frame H and extends downward. Upon the lower end of said arm I is a pin $i$, (best shown in Fig. 3,) to which the rod M is hooked. The rod M is also connected by the arm N to the rock-shaft O, which shaft is supported upon brackets $K^2 K^3$ and has at one of its ends a lever P, adapted to receive connections by which a rocking motion is imparted to the shaft. Over the mold G are openings $s\ s'$ in the pipe S, which pipe leads from a water-reservoir. (Not shown.) The flow of the water through the pipe S is regulated by the stop-cock Q. Cold-air tubes T T', connecting with a suitable blower, project downward from the cold-air passage U, with open ends directly over the mold G.

V is the return air-passage, through which the air is by the blower returned to the air-cooler, there to be recooled in order to be reintroduced to the freezing-compartment X.

W is the door through which the can may be removed from the freezing-compartment after the ice is formed, during which removal the air-passages leading to and from such compartment are closed.

A rocking motion having been imparted to the shaft O through connections with the lever P, and the rod M being hooked to the pin $i$ at the lower end of the lever-arm I, the frame H, with the mold G resting upon it, is thereby given a rocking motion. At the same time the water to be frozen is gradually fed to the mold G through the pipe S, and a current of air, cooled below the freezing-point, blown into the cold-air passage U and through the tubes T T', which air, falling upon the water as it is spread out by the rocking of the mold, freezes it in a succession of thin layers or films and a cake of ice is formed, as hereinbefore described.

As indicated by the partial view in Fig. 3 of a second freezing-chamber, a series of freezing-chambers similar to the one described may be arranged side by side. One rock-shaft may be extended through the series of chambers and connections made with the frame holding each mold. The cold-air passage may run along all the chambers with openings into each, and a single refrigerating-machine thus supply the cold air to the entire series. When it is desired to remove a mold, the hooked rod is lifted from the pin on the lever-arm of the frame, and the mold being brought to rest is withdrawn from the chamber through the side opening without disturbing the freezing in any of the other molds. This withdrawal may be facilitated by the use of small rollers $a\ b$, located at the end of the frame H nearest the side opening. Ordinary wooden partitions are sufficient between the several compartments, as these are of even temperature, and it is not necessary that they should be insulated one from another.

Various motions may be given to the molds other than the one described.

In case the water to be used is brackish or impure, it should be filtered or otherwise purified before entering the molds. There is also nothing in my process to prevent the water being previously deprived of its air by boiling or distillation or by being subjected to a vacuum produced by a special pump, as has hitherto been done.

Having thus described my invention, what I claim as new, and desire to secure by Letters Patent, is—

The herein-described improvement in the art of making ice, the same consisting in slowly supplying water to a mold adapted to hold the same while being frozen, tilting or inclining the mold and thereby running the water so supplied off from a portion of the bottom of the same, so as to expose a film over such portion, freezing such exposed film by a current of cold air or other gas, tilting or inclining the mold in another direction, and thereby returning the water over the frozen film and exposing a film over another portion of the bottom, freezing the film as before, and likewise freezing additional films until a block of ice of the required thickness is formed, substantially as set forth.

GEO. F. MEYER.

Witnesses:
HUBERT A. BANNING,
ROBT. G. MONROE.